INVENTORS
RAYMOND FREDERICK HALL
KENNETH ARTHUR SHERWIN

FIG.4
FIG.5
FIG.6
FIG.7

United States Patent Office 3,431,076
Patented Mar. 4, 1969

3,431,076
METHOD AND APPARATUS FOR THE DETERMINATION OF FREE SULPHATE ION IN SLURRIES
Raymond Frederick Hall and Kenneth Arthur Sherwin, Ipswich, Suffolk, England, assignors to Fisons Fertilizers Limited, Felixstowe, Suffolk, England
Filed July 6, 1966, Ser. No. 563,254
Claims priority, application Great Britain, July 8, 1965, 28,961/65
U.S. Cl. 23—230
Int. Cl. G01n 31/02; C01b 25/18

15 Claims

This invention is concerned with improvements in or relating to the estimation of free sulphate ion in slurries arising in the wet process for the manufacture of phosphoric acid.

In the manufacture of phosphoric acid by the wet process there is formed a slurry consisting of calcium sulphate crystals suspended in phosphoric acid, i.e. $H_3PO_4$, for example containing 30 to 40% by weight of $P_2O_5$ based on the weight of the slurry and sulphuric acid together with impurities such as fluosilicates and organic material derived from the action of sulphuric acid on phosphate rock. Such a slurry will hereinafter be referred to as a wet-process phosphoric acid slurry. An important feature in the control of the process is the maintenance of the correct excess of sulphuric acid in the liquid phase of the slurry and it is also of value to be able to measure the concentration of the solid phase in the slurry.

It has now been found that the free sulphate ion content, in a wet process phosphoric acid slurry may conveniently be estimated by measurement of the heat evolved on mixing the liquid phase of the slurry with a suitable reagent. It is also possible, as will be described in greater detail below, to estimate the concentration of solid in the slurry by similar thermal measurement on the slurry itself.

According to the invention, therefore, there is provided a method for estimating free sulphate ion ($SO_4^{--}$) in a wet process phosphoric acid slurry which comprises reacting, in measured proportions, the liquid phase of said slurry with a liquid reagent which undergoes an exothermic reaction with sulphate ion and measuring the rise in temperature produced by the reaction of the sulphate ion and the reagent.

The liquid reagent used should be one which undergoes a substantially irreversible reaction with sulphuric acid and which undergoes little or no other thermal reaction with the slurry. Preferably the reagent is one which leads to the formation of an insoluble precipitate with sulphate ion and thus the reagent may contain, for example, barium, lead or strontium ions, barium containing reagents being especially preferred. Thus the reagent may be a solution of a soluble barium, strontium or lead salt in an aqueous medium such as water, nitric acid, hydrochloric acid or phosphoric acid. Examples of suitable soluble salts are barium hydroxide, barium chloride, barium phosphate, strontium chloride, strontium hydroxide, strontium nitrate, lead chloride, lead nitrate and lead acetate. The preferred reagent for use in the process according to the invention is a solution of barium phosphate [$Ba_3(PO_4)_2$] in aqueous phosphoric acid and in the following description reference will be made only to such a solution although it is to be understood that other reagents may be used, for example those described above. Such a solution may be prepared, for example, by dissolving barium phosphate, barium carbonate or barium hydroxide in phosphoric acid. It has been found that the addition of a small amount of gelatine to the solution to aid the crystallisation of barium phosphate may prove desirable.

In order to avoid side heating effects, for example due to heats of dilution, it is convenient to use the barium phosphate in solution in phosphoric acid having a strength approximately equal to that of the process acid. Thus, it has been found that negligible errors arise using phosphoric acid having a strength within ±2%, preferably within ±1%, of that of the plant acid, i.e. containing from about 28 to about 32 weight percent $P_2O_5$. The amount of barium phosphate in solution employed should be at least sufficient to precipitate all free sulphate ion in the slurry as barium sulphate, solutions containing up to 20% by weight of barium phosphate proving convenient.

It has been found that the use of such barium phosphate solutions in the process according to the invention gives results which are in direct relationship to those obtained by conventional gravimetric methods.

The reaction of the slurry liquor with the barium phosphate solution may be carried out in continuous or semicontinuous stream or batchwise.

According to a further embodiment of the invention there is provided an apparatus for carrying out the process of the invention comprising a reactor vessel having means for introducing barium phosphate solution and slurry liquor in measured proportions and means for detecting the rise in temperature on reaction of the two reactants.

The estimation reactor vessel may be located in or out of the phosphoric acid slurry; preferably being located in the slurry when adapted to carry out the estimation batchwise and out of the slurry when adapted to carry out the estimation in a continuous manner. Thus, when the estimation is carried out batchwise the estimation reactor vessel should preferably be located in a constant temperature environment and such conditions are simply afforded by immersing the reactor in the phosphoric acid slurry. Additionally, when the estimation is carried out batchwise, the reactor vessel is preferably thermally insulated, advantageously with an insulating material of low heat capacity, the reactor vessel also preferably being of low heat capacity. The temperature rises involved are of the order of 3° C.

Where the estimation is carried out continuously it is not so important that the estimation reactor be located in a constant temperature environment although it should preferably be located in an environment subject only to small or gradual temperature fluctuations. Also, in the continuous estimation, it is not necessary that the reactor vessel be thermally insulated neither is the thermal capacity of the reactor vessel of importance since the apparatus achieves a steady state in which the thermal response is substantially independent of the thermal capacity of the reactor vessel.

Thus, where the process is carried out continuously, the apparatus will generally be located apart from the slurry reactor vessel and supplied with slurry liquor by suitable pumping and filtration arrangements. In this form of apparatus, the reactor vessel must also be provided with an outlet for the spent liquor; this may be arranged, for example, by an overflow device.

The rise in temperature is conveniently measured by some form of device which indicates the temperature electrically; for example thermocouples, thermistors, or a network of thermally sensitive resistance elements.

In order that the invention may be well understood three preferred embodiments of apparatus for carrying out the process according to the invention will now be described with reference to the accompanying diagrammatic drawings in which:

FIGURE 4 is a cross section through one form of continuous device;

FIGURE 5 is a diagram showing in greater detail the arrangement of thermocouples in FIGURE 4;

FIGURE 6 is a cross section through another form of continuous device; and

FIGURE 7 is a diagram showing in greater detail the arrangement of thermocouples in FIGURE 6.

Figure 1:
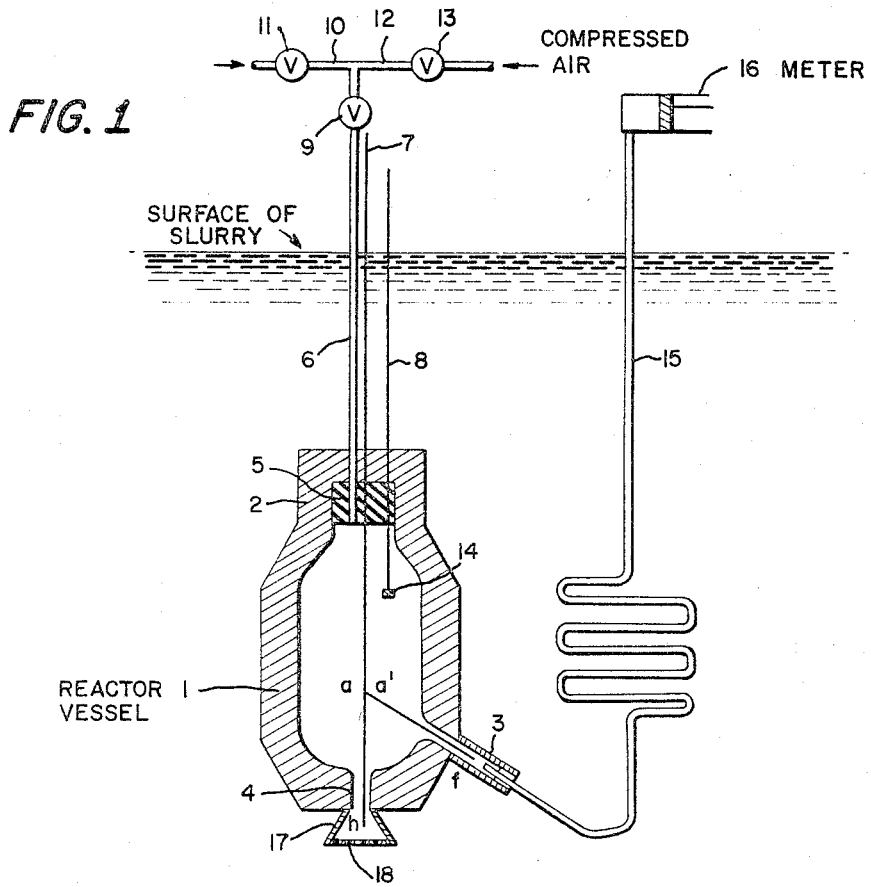
FIGURE 1 is a cross-sectional view of a batchwise apparatus.

Referring to FIGURE 1 of the drawings, the apparatus consists of a reactor vessel 1 of substantially circular cross-section and having upper neck 2, side inlet 3 and lower inlet-outlet duct 4, the whole being immersed in the body of the slurry below the surface level thereof. Upper neck 2 of reactor vessel 1 is sealed by sealing means 5 and sealing means 5 is pierced in a water and gas-tight manner by vent pipe 6, thermocouple leads 7 and electric probe leads 8. Vent pipe 6, which projects above the surface of the slurry is provided with valve means 9 and terminates in a T-piece, arm 10 of which is provided with valve means 11 and is open, at its outer end, to the atmosphere; other arm 12 being provided with valve means 13 and being connected to a source of compressed air (not shown).

Thermocouple leads 7 are led above the surface of the slurry and are connected to a potentiometer or other potential difference measuring means (not shown).

Electric probe leads 8 terminate in the reactor in electric probe 14 and are connected above the surface of the slurry with means (not shown) for activating valve means 9.

Figure 3:
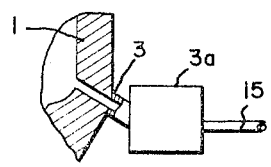
FIGURE 3 shows a preferred arrangement of the solution inlet in FIGURE 1.

Side inlet 3 is connected to reagent pipe 15 having an extended path through the body of the slurry to metering means 16, shown diagrammatically, for introducing measured amounts of barium phosphate solution, via pipe 15 and side-inlet 3, into reactor vessel 1. In a particular preferred embodiment of the apparatus (FIGURE 3) side-inlet 3 is enlarged outside vessel 1 to provide a waiting or equilibrating chamber 3a. This enlarged chamber ensures mixing of the barium phosphate solution prior to entry into reaction vessel 1 and hence that all barium phosphate solution injected is at the same temperature. Chamber 3a may be of any convenient shape and should preferably have a volume greater than that of the amount of solution to be injected, advantageously a volume of the order of two or three times greater than such volume. In the following description reference will be made only to side-inlet 3 but it is to be understood that where appropriate such reference also includes reference to chamber 3a. Lower inlet-outlet duct 4 is connected at its lower end to hollow frusto-conical member 17 having at its lower end a removably coarse filter 18.

Reactor vessel 1, neck 2, inlet-outlet duct 4 and the inner portions of side-inlet 3, vent-pipe 6, leads 7 and 8 and frusto-conical member 17 are surrounded by thermal insulation (not shown).

Referring to FIGURE 1 of the drawings the thermocouples are arranged with junctions $a$ and $a'$ in the body of the reactor and junctions $h$ and $f$ at the inlet-outlet duct 4 and side-inlet 3 respectively. In the drawing copper leads are indicated as continuous lines and constantan leads as broken lines.

In operation, valve means 11 is closed and valve means 9 and 13 are opened to allow compressed air into the body of the rector to flush out any liquid therein. Air is allowed to bubble from the bottom of the reactor and then valve means 13 is closed and the apparatus left for a short time to allow the temperature in the reactor to equilibrate with that of the slurry.

Alternatively valve 13 only may be opened to admit compressed air in the conduit between valves 9 and 13, valve 13 then closed and valve 9 opened; the amount of compressed air trapped between valves 9 and 11 being sufficient to displace all liquid from vessel 1.

Valve means 11 is then opend and the hydrostatic pressure forces liquid through filter 18. The filtrate rises in reactor vessel 1 until it reaches the level of electric probe 14 which causes valve means 9 to close and thus stop the inflow of filtrate into vessel 1. During the filtering period a pre-set volume of barium phosphate solution is forced slowly into vessel 1 by metering means 16 via pipe 15 and side-inlet 3; this volume of barium phosphate solution preferably being equal to half the effective volume of reaction vessel 1, that is the volume of barium phosphate solution is equal to the volume of filtrate. It is preferred that the introduction of barium phosphate solution should terminate just before the level of the liquid in the reactor reaches probe 14, so that the ratio of reactants is very nearly the required value at the time of cut-off. This may be arranged by a timing device which adjusts the start of introduction of solution with reference to the interval between the termination of introduction of barium phosphate solution and the moment of cut-off in the preceding cycle. Variations in the rate of filtration may thus be allowed for.

After measuring the thermal differential, valve 11 is closed and valves 9 and 13 opened to expel the contents of the reactor and the apparatus is then ready for the next estimation cycle.

Figure 2:
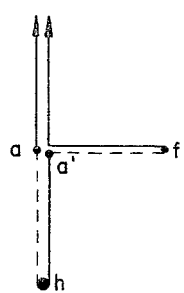
FIGURE 2 is a diagram showing in greater detail the arrangement of the thermocouples in the apparatus.

The barium phosphate solution pipe 15 is long enough to ensure close matching of the temperature of the barium phosphate solution and the temperature of the slurry before admixture in the reactor, but compensation for any differences is obtained by suitable disposition of the thermocouples as shown in FIGURE 2. With this arrangement the thermal E.M.F. registered by the potentiometer will derive from $(a+a')-(h+f)$. If the volume of barium phosphate solution and slurry liquor are the same the signal is double the mean rise of the temperature of the liquids. Volume ratios other than 1:1 can be used providing the thermocouple elements are in like integer proportions or a suitable compensating network is employed.

Figures 4, 5, 6, 7:
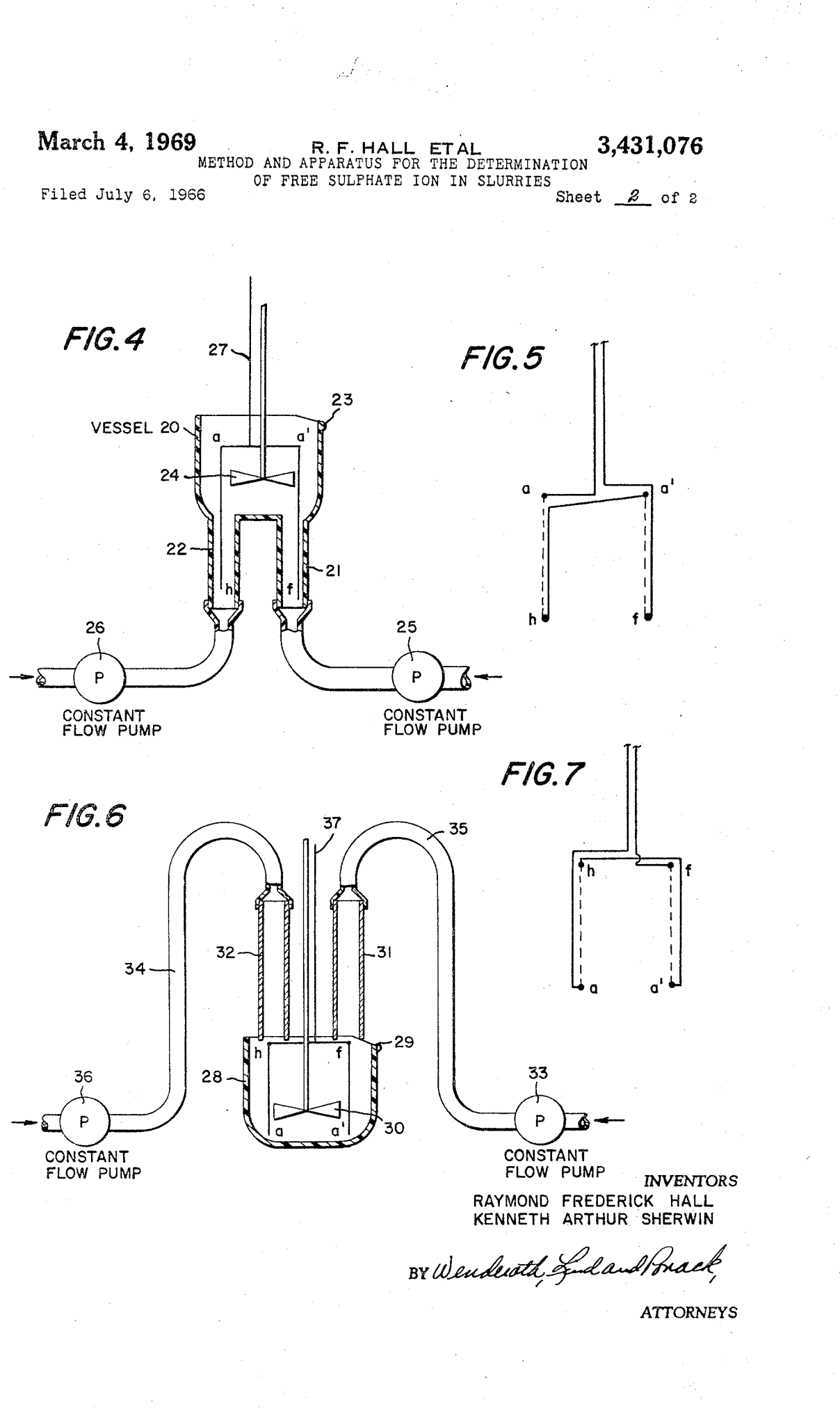

Referring now to FIGURE 4 of the drawings a continuous apparatus for estimating sulphate ion in a wet-process phosphoric acid slurry comprises a vessel 20 having in the bottom part thereof inlet tubes 21 and 22. Vessel 20 has a depressed lip 3 in its rim to permit the overflow of liquid from the vessel and is further provided with a stirrer 24 to agitate liquid in the vessel. Inlet tube 21 is connected in a constant flow pump 25, to a source of a solution of barium phosphate in phosphoric acid (not shown) and inlet tube 22 is similarly connected, via a constant flow pump 26, to a source of supply of filtered liquor from the phosphoric acid slurry. Arranged within inlet tubes 21 and 22 and vessel 21 are thermocouple leads 27 which are connected to means for measuring an E.M.F. (not shown).

Referring to FIGURE 5 of the drawing the thermocouples are arranged with junctions $a$ and $a'$ in the body of the reactor and junctions $h$ and $f$ in inlet tubes 22 and 21 respectively. In the diagram copper leads are indicated as continuous lines and constantan leads as broken lines.

Referring now to FIGURE 6 of the drawing another form of continuous apparatus for estimating sulphate ion in a wet-process phosphoric acid slurry comprises a vessel 28 having a depressed lip 29 to permit the overflow of liquid from the vessel and provided with a stirrer 30. Vessel 28 may be constructed of a suitable flexible material such as polyvinyl chloride or polytetrafluoroethylene so that any deposits of barium sulphate may be removed from its walls. Projecting downwards to vessel 28 are inlet tubes 31 and 32, the lower ends of which are located just above the possible upper level of liquid in vessel 28 so as to prevent any possible build up of barium sulphate in their mouths. Inlet tube 31 is connected, via constant flow pump 33, to a source of a solution of barium phosphate in phosphoric acid (not shown) and similarly inlet tube 32 is connected, via constant flow pump 36, to a source of filtered liquor from the phosphoric acid slurry. Arranged within inlet tubes 31 and 32 and vessel 28 are thermocouple leads 37 which are connected to means (not shown) for detecting an E.M.F.

Referring to FIGURE 7 of the drawings the thermocouples are arranged with junctions $a$ and $a'$ in the body of the reactor and junctions $h$ and $f$ at the mouth of inlet tubes 32 and 31 respectively. In the diagram copper leads are indicated as continuous lines and constantan leads as broken lines.

In operation both the apparatus of FIGURE 4 and that of FIGURE 6 are used in a similar manner and the following description which refers to the apparatus of FIGURE 4 may, it will be understood, be also taken as applying to the apparatus of FIGURE 6.

In operation, pumps 25 and 26 are activated to cause barium phosphate solution to flow through inlet tube 21 and to cause filtered slurry liquor to flow through inlet tube 22.

The liquids from the two inlet tubes mix in vessel 20, previously empty, and stirrer 24 is activated. After the vessel 20 is full and liquid is escaping over depressed lip 23, the apparatus has reached equilibrium and the sulphate ion in the slurry may be estimated from the E.M.F. generated by thermocouples 27. The rates of flow of barium phosphate solution and filtered liquid are preferably the same for the same reasons that the aliquots of solution and slurry liquor are the same in the batchwise apparatus. Similarly, however, rate ratios other than 1:1 may be used, providing the thermocouple elements are in like integer proportion or providing that electrical means are used to adjust the signals coming from the two parts of the system so that they are in the same ratio as the two liquid flow rates.

The free sulphate ion content of the slurry may be calculated from the temperature rise as follows:

Let
$v=$ volume of liquid phase of slurry containing the sulphate ion to be estimated or (in the continuous apparatus) the volume of slurry delivered in unit time.
$v'=$ volume of barium phosphate solution added; or (in the case of the continuous apparatus) the volume of solution delivered in unit time.
$w=$ free sulphate content of liquid phase of slurry (wt./vol.):
$h=$ heat liberated by unit weight of sulphate on reaction with barium phosphate to precipitate barium sulphate;
$s=$ specific heat of liquid phase of slurry;
$s'=$ specific heat of barium phosphate solution; and
$t=$ mean temperature rise of reactants.

Then, at the reaction:

Heat capacity of liquids in reaction vessel 1.

$$\mu = vs + v's'$$

Heat liberated by precipitation of barium sulphate $=vwh$;

$$\therefore \text{temperature rise } t = vwh/(vs + V's')$$
$$\therefore w = t(S+s')/h$$

and of
$$s = s'$$
$$w = 2ts/k$$
$$= Kt$$

where $K$ is a constant.

The process may also be used to find the ratio of solids in the slurry by carrying out the procedure as described above without filtering the slurry prior to entry into reactor vessel 1 in the batch apparatus. The solids ratio is then calculated by comparing the results of this test with these when filtering the slurry as follows:

Let
$r=$ ratio of solid to liquid phase in slurry;
$s''=$ specific heat of solid phase of slurry; and
$t'=$ mean rise in temperature.

Then,
heat capacity of material in reaction vessel 1, $$\mu = (1-r)vs + rvs'' + v's'$$

Heat liberated by precipitation $$= (1-r)vwh/\mu$$
$$\therefore t' = (1-r)vwh/$$
$$\therefore w = t'[(1-r)vs + rvs'' + v's'']/(1-r)vh$$

Since $w$ is the same in both cases $$t(vs+v's')/vh = t'[(1-r)vs + rvs'' + v's']/(1-r)vh$$
$$r = 2(t-t')/[2t-t'+t's''/s]$$

If $s'' \sim s$ $$\therefore r = (t-t')/t$$

The above calculations ignore the heat capacity of the reaction vessel which is assumed to be negligible compared with that of the contents.

We claim:
1. A method for estimating free sulphate ion in a wet process phosphoric acid slurry which comprises reacting, in measured proportions, the liquid phase of said slurry with a liquid reagent which undergoes an irreversible exothermic reaction with sulphate ion and measuring the rise in temperature produced by the reaction of the sulphate ion and the slurry, and deducing therefrom the concentration of free sulphate ion in said slurry.

2. A method according to claim 1 wherein said liquid reagent is one which leads to the formation of a substantially insoluble precipitate with sulphate ion.

3. A method according to claim 2 wherein said liquid reagent contains barium, lead or strontium ions.

4. A method according to claim 3 wherein said liquid reagent is a solution of barium phosphate in aqueous phosphoric acid.

5. A method according to claim 4 in which the barium phosphate is in solution in phosphoric acid having a strength approximately equal to that of the process acid.

6. Apparatus for estimating the sulphate ion content of a wet process phosphoric acid slurry by the method according to claim 1 comprising a reactor vessel having means for introducing the liquid reagent and slurry liquor in measured proportions and means for detecting the rise in temperature on reaction of the two reactants.

7. Apparatus according to claim 6 adapted for the batchwise estimation of sulphate ion in which the reactor vessel is thermally insulated and adapted to be immersed in the body of the slurry.

8. Apparatus as claimed in claim 7 in which the reaction vessel has an upper neck connected to a vent pipe, a lower inlet-outlet duct provided with a filter for the introduction and expulsion of slurry liquor and a side inlet adapted to be connected to a supply of liquid reagent.

9. Apparatus as claimed in claim 6 adapted for the continuous estimation of sulphate ion having an open reaction vessel provided with two inlet tubes in the bottom thereof, one adapted to be connected to a supply of slurry liquor and the other to a supply of liquid reagent.

10. Apparatus as claimed in claim 6 adapted for the continuous estimation of sulphate ion having an open reactor vessel provided with a pouring lip and a pair of inlet tubes extending downwards into the reaction vessel so that the lower ends of the tube are below the upper possible level of liquid in the reaction vessel; the two tubes being connected respectively to supplies of slurry liquor and liquid reagent.

11. Apparatus as claimed in claim 10 wherein the open reaction vessel is constructed of flexible material.

12. Apparatus according to claim 6 in which the rise in temperature is measured by a device which indicates the temperature electrically.

13. Apparatus for estimating the free sulphate ion content of a wet process phosphoric acid slurry comprising a thermally insulated reactor vessel adapted to be immersed in the body of the slurry said reactor vessel having an upper neck pierced by a vent pipe adapted to be connected by valve means to a source of compressed air or to the atmosphere above the slurry, a lower outlet-inlet duct provided with filtration means and a side inlet connected by a pipe having an extended path through the slurry via a metering pump to a source of supply of a solution of barium phosphate in phosphoric acid, said upper neck also being pierced by electrical leads connected to electrical means for indicating electrically the difference in temperature between the contents of the reaction and the mean temperature of the slurry and the solution of barium phosphate in phosphoric acid injected through said side inlet.

14. Apparatus for the continuous estimation of the free sulphate ion content of a wet process phosphoric acid slurry comprising an open reaction vessel separate from the body of the slurry which reaction vessel has in the bottom thereof two inlet tubes and in its rim a depressed lip to permit the overflow of liquid from the reaction vessel, one of said inlet tubes being connected via a constant flow rate pump to a supply of a solution of barium phosphate in phosphoric acid and the other of said inlet tubes being connected via a constant rate pump to a supply of filtered slurry liquor, said reaction vessel also being provided with agitation means for agitating liquid contained therein, and electrical means for indicating electrically the difference in temperature between the contents of the reaction vessel and the mean temperature of the slurry liquor and barium phosphate solution introduced via the two inlet tubes.

15. Apparatus for the continuous estimation of the free sulphate ion content of a wet process phosphoric acid slurry comprising an open reaction vessel having in its rim a depression to facilitate the overflow of liquid from the vessel separate from the body of the slurry, and a pair of inlet tubes extending vertically downwards into the reaction vessel so that the lower ends of the inlet tubes are below the upper possible level of liquid in the reaction vessel, one of said tubes being connected via a constant rate pump to a supply of a solution of barium phosphate in phosphoric acid and the other of said tubes connected via a constant rate pump to a supply of filtered slurry liquor, said reaction vessel also being provided with agitation means for agitating liquid contained therein and electrical means for indicating electrically the difference in temperature between the contents of the reaction vessel and the mean temperature of the slurry liquor and the barium phosphate solution introduced via the two inlet tubes.

References Cited

UNITED STATES PATENTS

| | | | |
|---|---|---|---|
| 2,979,385 | 4/1961 | Karasek et al. | 23—253 |
| 3,104,946 | 9/1963 | Veal | 23—230 XR |
| 3,178,263 | 4/1965 | Karasek et al. | 23—253 XR |

MORRIS O. WALK, *Primary Examiner.*

U.S. Cl. X.R.

23—165, 253